Patented June 7, 1949

2,472,489

UNITED STATES PATENT OFFICE 2,472,489

PREPARATION OF CLAY CATALYSTS

Jerry A. Pierce, Baton Rouge, La., assignor to Standard Oil Development Company, a corporation of Delaware No Drawing. Application October 18, 1947, Serial No. 780,767

4 Claims. (Cl. 252—450)

This invention relates to the activating of clays and more particularly with the preparation of activated clay catalysts for the conversion of hydrocarbon oils by treating the clay with acid.

It is known to treat clays of the bentonite type with inorganic acids such as hydrochloric or sulfuric acids to remove certain soluble portions of the clay and to convert them into active catalysts for hydrocarbon conversions and particularly for cracking of high boiling liquid hydrocarbons such as gas oil to motor fuels. The general method of activation is to digest the clay with an acid for a prolonged period, followed by washing and drying the treated clay. It has also been proposed to effect the acid treatment in two or more successive stages with filtering and washing of the clay between stages or by the mere addition of further amounts of acid at intervals without intermediate washing treatment. While these methods have produced catalysts of good activity, efforts are being continually made to further improve these catalysts.

It is the object of this invention to acid treat clays in order to remove greater amounts of impurities therefrom in an easier manner and form a more satisfactory activated clay catalyst.

It is a further object of this invention to acid treat clays in a novel manner in order particularly to reduce the amount of iron oxide contained in the final catalyst to a minimum and thereby form a clay catalyst having low carbon formation tendencies.

These and other objects will appear more clearly from the detailed specification and claims which follow.

I have now found that activated clay catalysts, particularly low in iron content can be produced if the clay is given a regular acid treatment with sulfuric acid, washed and dried and the dried clay is then given a further treatment with dilute hydrochloric acid of from about 0.5 to 10% strength preferably about 5 per cent strength, then washing, if desired, drying and activating the clay by heating to temperatures of from about 800 to about 1200° F., preferably at about 950° F. It was further found that when the acid treated clay is dried and retreated with dilute hydrochloric acid in accordance with the present invention, filtration and washing of the treated clay can be carried out more readily reducing substantially the time and the expense of this operation.

While I do not wish to be restricted to any particular theory it is believed that an explanation for the improved results obtained by my process is as follows. The regular acid treatment with sulfuric acid serves to dissolve numerous impurities contained in the clay including the iron, calcium and also part of the alumina (the so-called gamma alumina). Washing of the acid treated clay is a slow, tedious process and in view of the difficulties encountered in percolating wash water through the treated clay which is rendered somewhat gelatinous or slimy by the acid treatment, the washing in practice is terminated before freedom from water soluble material is achieved. When the clay is then dried, a very dilute solution of water solubles such as 0.01% solution of ferric sulfate contained in the clay particles apparently tends to creep to the surface of the porous clay particles where it is evaporated, leaving on the surface of the particles a 1 to 5% incrustation of slowly soluble or water-insoluble ferric sulfate. This deposit though small in total amount is particularly active due to its concentration on the surface of the clay particles, providing a maximum area of contact. This deposit or incrustation of ferric sulfate is insoluble or difficultly soluble in water but, a brief leaching with very dilute hydrochloric acid suffices to dissolve the ferric sulfate and carry it into solution. Any residual ferric chloride formed can be readily washed from the clay particles or, in view of the volatility of the ferric chloride it can be left on the clay since it will be easily driven off when the clay is heated in order to activate it.

The initial acid treatment, or so-called regular acid treatment of the clay involves digesting the clay with from about 30 to about 75 parts by weight of sulfuric acid (100% strength) per 100 parts by weight of dried clay, said sulfuric acid being diluted with water and applied to the clay at a concentration of from 5 to 25 weight per cent, preferably at about 12.5% concentration. The acid treatment may be carried out under fairly wide range of temperatures, from about 150° F. up to the boiling temperature and for from a few hours to several days. Ordinarily about 5 to 6 hours at the boiling temperature will suffice to effect dissolution of the removable impurities.

After the acid treatment, the clay is washed substantially free of water solubles, preferably with soft water. The washed clay is then dried at temperatures of about 180°–212° F. or higher, for example by heating in a steam oven or the like. Drying is continued until the amount of volatiles in the clay is within the range of 5 to 25 weight per cent; 5 weight per cent appearing to be a practical lower limit for volatiles since the removal of further amounts of volatiles would lead to damage to the clay and would also be uneconomical. Ordinarily, the clay is dried to about 20 weight per cent of volatile materials.

The dried clay is then subjected to the second acid treatment in accordance with the present invention. This treatment is effected with dilute hydrochloric acid of about 0.5 to 10 weight per cent concentration. This acid treatment or light hydrochloric acid wash can be carried out at room temperature or the treatment can be effected with a hot acid solution since the latter theoretically should dissolve the salt more readily than a cold solution. The amount of acid solution applied to effect dissolution and removal of the ferric sulfate can vary between about 200 and about 1000 pounds of dilute acid per 100 pounds of air dry clay i. e. clay containing from 5 to 25 weight per cent volatile matter. Ordinarily about 300 pounds of 5% hydrochloric acid will suffice for washing 100 pounds of dry clay.

The acid treatment or light hydrochloric acid wash can be carried out in various ways. For example, the dried clay can be slurried in the dilute acid and then filtered to separate the excess treating agent from the clay or the clay can be treated with acid directly on suitable filtering means. Other expedients for carrying out the treatment readily suggest themselves such as treating the clay either in a plurality of vats arranged in series with countercurrent flow of treating acid or on a plurality of filters with flow of acid sequentially from the filter first charged to the filter last charged with clay.

Water washing of the clay after the hydrochloric acid wash is not necessary as ferric chloride is volatile with heat and will be removed upon activation. The clay can, however, be given a water wash with soft or distilled water. The clay is then dried at about 180° to about 212° F. and activated by heating to temperatures of about 800° to 1200° F., preferably at about 850°-900° F. for three or four hours.

The clays which may be advantageously treated in accordance with the present invention are bentonites or montmorillonite clays. Several clays of this type have taken the names of their areas of origin such as Cheto, Attapulgus, Chisholm, etc. are essentially the same and are activatable in accordance with the present invention.

The following examples are given by way of illustration of the present invention:

*Example I*

A bentonite described as Cheto, B-138 was reduced to 100 mesh and 1190 g. (equivalent to 1000 g. of dry substance) was weighed out. This was placed in a lead reactor previously heated to 200° F. A solution consisting of 408 cc. (750 g.) of 1.89 sp. gr. sulfuric acid and 5060 cc. of distilled water was added to the clay. The acid solution represented a dosage of approximately 75% and a concentration of approximately 12.5%. A temperature of 200° F. and vigorous agitation were maintained for 6 hours by injecting a mixture of steam and air. At the end of 6 hours steam and air were turned off and the slurry was quenched with an equivalent amount of water. It was then filtered and washed to approximately a pH of 7. Drying was carried on in a steam oven at about 180° F. to about 20 weight per cent of volatile matter.

The above material was placed in a conical pharmaceutical percolator and a total of 5000 cc. of 5% HCl (at 150° F.) was allowed to drip through it. One final water wash was made. Test for Fe ion by potassium ferricyanide was negative. The material was then dried in a steam oven and then activated at 950° F. for 3 hours. When utilized in the catalytic conversion of hydrocarbon oils to motor fuels the clays treated in accordance with this procedure will form less carbon under given reaction conditions than similarly treated clays which are not dried and after treated with a dilute hydrochloric acid wash.

*Example II*

Chisholm bentonite containing 20% total volatile matter was used. A quantity of 565 grams (representing 450 grams dry substance) was treated with 25% of its weight of oxalic acid dissolved in water to a concentration of 5% and the slurry formed by adding it to the clay was stirred mechanically for 5 hours at 185° F. It was then filtered and washed with 2 liters of distilled water. The slurry was then filtered and dried at 195° F. and then percolated with 2 liters of 2% HCl heated to 195° F. It was then percolated with water and again with 2 liters of 2% HCl. The filtered cake was then treated with sulfuric acid, using 75 parts by weight of 1.89 sp. gr. sulfuric acid per 100 parts of air dry clay, at a concentration of 12.5 weight per cent. It was stirred 5 more hours at 190° F., filtered, washed practically free of sulfates to barium chloride and dried at 195° F. The dried material was once more percolated with 2% HCl at 150° F. Two liters of 2% HCl were used followed by a water wash. The final filtered cake was then dried at 185° F. and activated 3 hours at 900° F. This clay has low carbon formation tendencies comparable with those of the clay of Example I.

The foregoing description contains a limited number of embodiments of the present invention. It will be understood, however, that numerous variations are possible without departing from the scope of the following claims.

What I claim and desire to secure by Letters Patent is:

1. A method of producing a catalyst useful for the catalytic cracking of hydrocarbon oils which comprises digesting a bentonite clay with sulfuric acid to produce an activated clay, washing the clay to remove the products of such treatment, drying the clay, treating the dried clay with a dilute hydrochloric acid wash, drying and activating the treated clay by heating to from 800° to 1200° F.

2. A method of producing a catalyst useful for the catalytic cracking of hydrocarbon oils which comprises digesting a bentonite clay with sulfuric acid to produce an activated clay, washing the clay to remove the products of such treatment, drying the clay to from 5 to 25 weight per cent of volatiles, treating the dried clay with dilute hydrochloric acid of from 0.5 to 10 weight per cent concentration, drying and activating the treated clay by heating to from 800° to 1200° F.

3. A method of producing a catalyst useful for the catalytic cracking of hydrocarbon oils which comprises digesting a bentonite clay with sulfuric acid to produce an activated clay, washing the clay to remove the products of such treatment, drying the clay, treating the dried clay with a dilute hydrochloric acid wash, in the ratio of from 200 to 1000 pounds of dilute hydrochloric acid per 100 pounds of air dry clay, drying and activating the treated clay by heating to from 800° to 1200° F.

4. A method of producing a catalyst useful for the catalytic cracking of hydrocarbon oils which comprises digesting a bentonite clay with sulfuric acid to produce an activated clay, washing the clay to remove the products of such treatment, drying the clay to from 5 to 25 weight per cent of volatiles, treating the dried clay with dilute hydrochloric acid of from 0.5 to 10 weight per cent concentration, in the ratio of from 200 to 1000 pounds of dilute hydrochloric acid per 100 pounds of air dry clay, drying and activating the treated clay by heating to from 800° to 1200° F.

JERRY A. PIERCE.

REFERENCES CITED

The following references are of record in the file of this patent:

UNITED STATES PATENTS

| Number | Name | Date |
| --- | --- | --- |
| 1,913,960 | Roll | June 13, 1933 |
| 2,207,145 | Doht | July 9, 1940 |
| 2,397,505 | Richardson | Apr. 2, 1946 |
| 2,445,370 | Spicer | July 20, 1948 |